US012621851B2

(12) United States Patent
Ji et al.

(10) Patent No.: US 12,621,851 B2
(45) Date of Patent: May 5, 2026

(54) HANDLING SIDELINK TRANSMISSIONS AND RECEPTIONS

(71) Applicant: Nokia Technologies Oy, Espoo (FI)

(72) Inventors: Lianghai Ji, Aalborg (DK); Nuno Manuel Kiilerich Pratas, Aalborg (DK); Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 433 days.

(21) Appl. No.: 18/254,661

(22) PCT Filed: Dec. 10, 2021

(86) PCT No.: PCT/EP2021/085169
§ 371 (c)(1),
(2) Date: May 26, 2023

(87) PCT Pub. No.: WO2022/152474
PCT Pub. Date: Jul. 21, 2022

(65) Prior Publication Data
US 2024/0023144 A1      Jan. 18, 2024

(30) Foreign Application Priority Data

Jan. 13, 2021   (EP) .................................... 21151307

(51) Int. Cl.
H04W 72/40      (2023.01)
H04W 28/26      (2009.01)
H04W 76/28      (2018.01)

(52) U.S. Cl.
CPC ........... H04W 72/40 (2023.01); H04W 28/26 (2013.01); H04W 76/28 (2018.02)

(58) Field of Classification Search
CPC ...... H04W 72/40; H04W 76/28; H04W 28/26
See application file for complete search history.

(56) References Cited

U.S. PATENT DOCUMENTS 9,936,482 B2      4/2018  Jung et al.
2018/0234888 A1   8/2018  Yasukawa et al.
(Continued)

FOREIGN PATENT DOCUMENTS

WO         2020/033422 A1      2/2020
WO         2020/037688 A1      2/2020
WO      WO-2020248997 A1 *  12/2020   ........... H04L 5/0044

OTHER PUBLICATIONS

"WID revision: NR sidelink enhancement", 3GPP TSG RAN Meeting #89e, RP-201516, Agenda: 9.8.3, LG Electronics, Sep. 14-18, 2020, 6 pages.
(Continued)

*Primary Examiner* — Sujoy K Kundu
*Assistant Examiner* — Weibin Huang
(74) *Attorney, Agent, or Firm* — Carter, DeLuca & Farrell LLP

(57) ABSTRACT

A method comprising receiving an indication from a transmitting terminal device indicative of a sidelink resource reserved for receiving a subsequent sidelink transmission from the transmitting terminal device, detecting that the subsequent sidelink transmission is not received from the transmitting terminal device over the reserved sidelink resource, determining a sidelink complementary resource set window, and monitoring the sidelink complementary resource set window for receiving the subsequent sidelink transmission from the transmitting terminal device.

1 Claim, 5 Drawing Sheets

(56)          References Cited

U.S. PATENT DOCUMENTS

| | | | |
|---|---|---|---|
| 2020/0229171 A1 | 7/2020 | Khoryaev et al. | |
| 2020/0260463 A1 | 8/2020 | Lovlekar et al. | |
| 2020/0305174 A1 | 9/2020 | Ganesan et al. | |
| 2020/0374864 A1* | 11/2020 | Kuang | H04W 8/26 |
| 2021/0144750 A1* | 5/2021 | Cao | H04W 72/0453 |
| 2022/0295450 A1* | 9/2022 | Xu | H04W 72/02 |
| 2023/0276494 A1* | 8/2023 | Wu | H04W 74/0808 |
| | | | 370/329 |
| 2023/0389100 A1* | 11/2023 | Guo | H04B 17/336 |

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"SL DRX with pre-indicated resources", 3GPP TSG-RAN WG2 Meeting #113 Electronic, R2-2101207, Agenda: 8.15.2.2, Nokia, Jan. 25-Feb. 5, 2021, 2 pages.

"LTE; 5G; Overall description of Radio Access Network (RAN) aspects for Vehicle-to-everything (V2X) based on LTE and NR (3GPP TR 37.985 version 16.0.0 Release 16)", ETSI TR 137 985, V16.0.0, Jul. 2020, 37 pages.

"IEEE 802.11", Wikipedia, Retrieved on Jun. 2, 2023, Webpage available at : https://en.wikipedia.org/wiki/IEEE_802.11.

"IEEE 802.15", Wikipedia, Retrieved on Jun. 2, 2023, Webpage available at : https://en.wikipedia.org/wiki/IEEE_802.15.

Extended European Search Report received for corresponding European Patent Application No. 21151307.2, dated Jul. 19, 2021, 7 pages.

International Search Report and Written Opinion received for corresponding Patent Cooperation Treaty Application No. PCT/EP2021/085169, dated Mar. 23, 2022, 10 pages.

Notice of Allowance received for corresponding European Patent Application No. 21151307.2, dated Nov. 19, 2024, 8 pages.

* cited by examiner

500

HANDLING SIDELINK TRANSMISSIONS AND RECEPTIONS

RELATED APPLICATION

This application was originally filed as PCT Application No. PCT/EP2021/085169 on Dec. 10, 2021, which claims priority from EP application Ser. No. 21/151,307.2, filed on Jan. 13, 2021, each of which is incorporated herein by reference in its entirety.

FIELD

The following exemplary embodiments relate to wireless communication and to sidelink transmissions between terminal devices.

BACKGROUND

Wireless communication may take place between terminal devices via an access node. Such communication may be seen as a hierarchical communication. While it has its benefits, there may also be communication taking place directly between two or more devices without having an access node in-between.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to a second aspect there is provided an apparatus comprising at least one processor, and at least one memory including a computer program code, wherein the at least one memory and the computer program code are configured, with the at least one processor, to cause the apparatus to transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

According to a third aspect there is provided an apparatus comprising means for receiving an indication from a transmitting terminal device indicative of a sidelink resource reserved for receiving a subsequent sidelink transmission from the transmitting terminal device, detecting that the subsequent sidelink transmission is not received from the transmitting terminal device over the reserved sidelink resource, determining a sidelink complementary resource set window, and monitoring the sidelink complementary resource set window for receiving the subsequent sidelink transmission from the transmitting terminal device.

According to a fourth aspect there is provided an apparatus comprising means for transmitting an indication to a terminal device indicative of a sidelink resource reserved for transmitting a subsequent sidelink transmission, detecting that the subsequent sidelink transmission will not be transmitted over the reserved sidelink resource, determining a sidelink complementary resource set window, and transmitting the subsequent sidelink transmission over a resource within the sidelink complementary resource set window.

According to a fifth aspect there is provided a method comprising receiving an indication from a transmitting terminal device indicative of a sidelink resource reserved for receiving a subsequent sidelink transmission from the transmitting terminal device, detecting that the subsequent sidelink transmission is not received from the transmitting terminal device over the reserved sidelink resource, determining a sidelink complementary resource set window, and monitoring the sidelink complementary resource set window for receiving the subsequent sidelink transmission from the transmitting terminal device.

According to a sixth aspect there is provided a method comprising transmitting an indication to a terminal device indicative of a sidelink resource reserved for transmitting a subsequent sidelink transmission, detecting that the subsequent sidelink transmission will not be transmitted over the reserved sidelink resource, determining a sidelink complementary resource set window, and transmitting the subsequent sidelink transmission over a resource within the sidelink complementary resource set window.

According to a seventh aspect there is provided a computer program comprising instructions for causing an apparatus to perform at least the following: receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to an eighth aspect there is provided a computer program comprising instructions for causing an apparatus to perform at least the following: transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

According to a ninth aspect there is provided a computer program product comprising instructions for causing an apparatus to perform at least the following: receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to a tenth aspect there is provided a computer program product comprising instructions for causing an apparatus to perform at least the following: transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

According to an eleventh aspect there is provided a computer program comprising instructions stored thereon for performing at least the following: receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to a twelfth aspect there is provided a computer program comprising instructions stored thereon for performing at least the following: transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

According to a thirteenth aspect there is provided a non-transitory computer readable medium comprising program instructions for causing an apparatus to perform at least the following: receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to a fourteenth aspect there is provided a non-transitory computer readable medium comprising program instructions for causing an apparatus to perform at least the following: transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

According to a fifteenth aspect there is provided non-transitory computer readable medium comprising program instructions stored thereon for performing at least the following: receive an indication from a transmitting terminal device indicative of a sidelink resource reserved for receiving a subsequent sidelink transmission from the transmitting terminal device, detect that the subsequent sidelink transmission is not received from the transmitting terminal device over the reserved sidelink resource, determine a sidelink complementary resource set window, and monitor the sidelink complementary resource set window for receiving the subsequent sidelink transmission from the transmitting terminal device.

According to a sixteenth aspect there is provided non-transitory computer readable medium comprising program instructions stored thereon for performing at least the following: transmit an indication to a terminal device indicative of a sidelink resource reserved for transmitting a subsequent sidelink transmission, detect that the subsequent sidelink transmission will not be transmitted over the reserved sidelink resource, determine a sidelink complementary resource set window, and transmit the subsequent sidelink transmission over a resource within the sidelink complementary resource set window.

LIST OF DRAWINGS

In the following, the exemplary embodiments will be described in greater detail with reference to the embodiments and the accompanying drawings, in which FIGS. 1A and 1B illustrate an exemplary embodiment of sidelink communication between terminal devices.

DESCRIPTION OF EMBODIMENTS

Figures 1A, 1B:
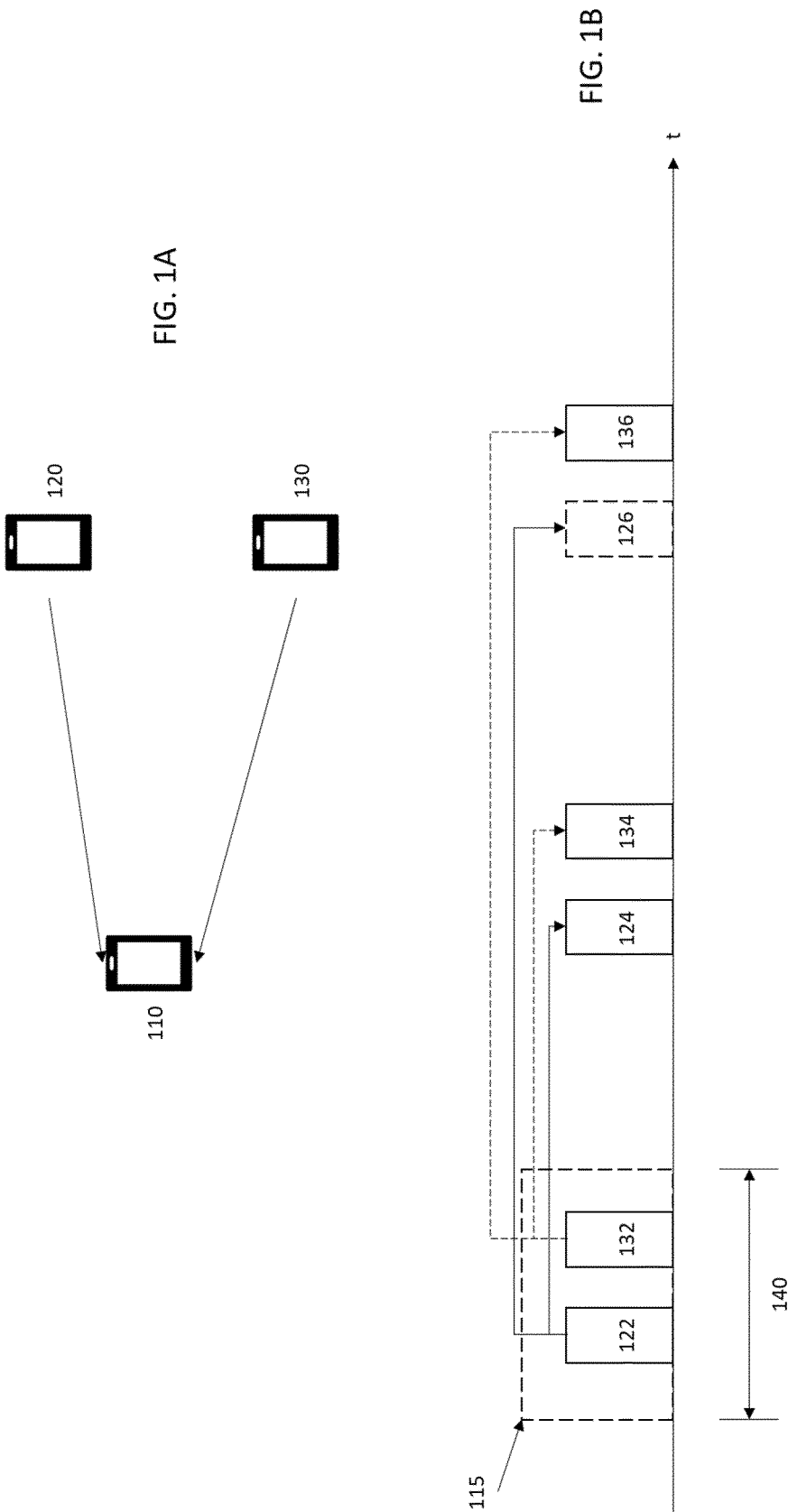

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Sidelink communication may be understood as communication between terminal devices in which the terminal devices connect to each other directly without an access node involvement, in other words, without relaying the data via a network such as a cellular communication network. Such terminal devices may be of any suitable type such as mobile phones, vehicles, robots or wearable consumer electronic devices. Sidelink communication may be enabled by 5G and/or 4G technology. Sidelink communication may be beneficial for example to allow devices with close proximity to each other to discover and connect to each other at high data rates and low latency. This may be useful for example in peer-to-peer gaming, vehicle platooning, etc. Also enhanced augmented reality and/or virtual reality may benefit from sidelink communication.

In sidelink communication, resource allocations as well as link adaptation are controlled by the terminal devices independently, which allows more control over usage of its resources to a terminal device. As sidelink communication allows reduction in latency due to being restricted to one hop, it may be useful for example in mission-critical industrial applications.

If sidelink discontinuous reception, DRX, is not standardized/used, then it may be that a terminal device receiving sidelink transmission is to monitor and be awake for a possible transmission to be received all the time, which consumes a lot of battery power. As a number of services used in sidelink communication allow periodic transmissions from a transmitting, Tx, terminal device to a receiving, Rx, terminal device, this periodic manner may be taken into account in sidelink design. For example, 5G sidelink and 4G vehicle to everything have taken the periodic manner of sidelink transmission into account in their design. Thus, for example a Tx terminal device using sidelink for its transmission may transmit sidelink control information, SCI, to indicate its transmission periodicity and future periodic resources that will be used for its (re)transmissions to the Rx terminal device.

As described above, a terminal device participating in sidelink communication participates in managing its sidelink resource allocation and/or sidelink resource selection as well. Therefore, if a Tx terminal device is to periodically transmit transmissions for a service to a Rx terminal device, traffic pattern and characteristics of the traffic are to be taken into account in periodic resource allocation or periodic resource selection. Examples of traffic pattern and characteristics comprise for example generation time of data, its periodicity, size and quality of service requirement. If the Rx terminal device receives from the Tx terminal device an SCI indicating and reserving future transmission resources, it is then aware of the transmissions that are to take place and may monitor resources correspondingly to be able to receive the transmissions from the Tx terminal device. Alternatively, the Rx terminal device may receive an indication indicative of one or more sidelink resources from the Tx terminal device and based on that indication, the Rx terminal device may reserve the one or more sidelink resources for future transmissions from the Tx terminal device.

It is to be noted that the future transmissions may be considered as subsequent or expected transmissions as well. The transmissions over the indicated/reserved resources may be used for periodic transmissions and/or re-transmissions. This allows the Rx terminal device to limit monitoring of sidelink transmissions to the resources indicated in the SCI which allows its power to be saved.

FIG. 1A illustrates an exemplary embodiment of sidelink communication between terminal devices 110, 120 and 130. In this exemplary embodiment the terminal devices 110, 120 and 130 are mobile phones, but other terminal devices and/or network infrastructures could also be used. In this exemplary embodiment terminal device 110 receives sidelink transmissions of data from both the terminal device 120 and the terminal device 130, which in this exemplary embodiment act as Tx terminal devices.

FIG. 1B illustrates an exemplary embodiment of transmissions that take place between the terminal devices introduced in the exemplary embodiment illustrated in FIG. 1A. The initial sidelink transmissions 115 are assumed to have occurred already in the context of this exemplary embodiment. Those may have occurred for example during time period 140 that corresponds to a sidelink, SL, discontinuous reception, DRX, on-duration of the terminal device 110. The horizontal axis t in the FIG. 1B illustrates time. As is illustrated, the terminal device 110 has received a first sidelink transmission, SL TX, 122, from the terminal device 120 and a first SL TX 132 from the terminal device 130.

In SL TX 122 the terminal device 120 may provide an indication regarding future reserved resources for its subsequent SL transmissions and/or re-transmissions. Also, in SL TX 132 the terminal device 130 may provide an indication regarding future reserved resources for its subsequent SL transmissions and/or re-transmissions. The indications may be provided for example by using information elements, IEs, e.g. frequency resource assignment, time resource assignment, and/or resource reservation period. These IEs may thus be carried in the first transmissions, e.g. the associated SCIs of the first transmissions, and thereby after receiving the SCIs and/or data packets in the SL TX 122 and SL TX 132, the terminal device 110 has knowledge of the future resources that will be used by the terminal devices 120 and 130 for their transmissions towards the terminal device 110. After that, the terminal device 110 may limit the monitoring it performs regarding the sidelink transmissions to the indicated resources. In this exemplary embodiment therefore, after receiving the SL TX 122 and SL TX 132, the terminal device 110 may monitor the resources for SL TX 124, 134, 126 and 136 and thereby achieve power savings. The power savings may be achieved for a limited period of time, for example until the reserved resources are not valid anymore or until its next SL DRX On-duration of the terminal device 110. It is to be noted that optionally the SL TX 124 may indicate future sidelink resource reservation for SL TX 126 and the SL TX 134 may indicate future sidelink resource reservation for 136. In addition, there may be one or more (re)transmission(s) over one or more indicated/reserved resource(s) between SL TX 122 and SL TX 124, as well as SL TX 132 and SL TX 134, which are not shown in FIG. 1B.

However, there may be situations in which a transmitting terminal device cannot transmit a sidelink transmission over resources reserved for a transmission, because of for example other communication activities overlapping in time domain. Therefore, in this exemplary embodiment, the terminal device 120 is not able to transmit the expected SL TX 126 while the terminal device 130 is still able to transmit the expected SLT TX 136. It may be for example that sidelink logical channel prioritization, LCP, procedure executed in medium access control, MAC, layer, the physical-layer SL prioritization procedure, the SL resource pre-emption procedure, and/or the SL resource re-evaluation procedure may cause the terminal device 120 to skip the SL TX 126 over the expected resource to the terminal device 110.

If a SL TX is not transmitted during the reserved resources and it is known that the receiving terminal device may not monitor for sidelink transmissions outside the reserved resources, this situation is to be addressed. Options for addressing the situation may include various approaches. For example, the SL TX that was not transmitted may be postponed until the next reserved/indicated sidelink resource. This may however cause additional latency that may lead to an expiry of a packet delay budget, PDB. Also, the transmitting terminal device may even throw away the delayed packet, which causes a packet loss. As another example, the SL TX that was not transmitted may be postponed until the next SL DRX On-duration of the receiving terminal device. It may be that the next SL DRX On-duration is scheduled to occur earlier than the next reserved/indicated SL resources for the SL TX. Yet, this may also cause additional latency and even a packet loss. It is to be noted though that for reasons of saving power consumption the SL DRX On-duration may occur with a larger interval than the interval of two reserved/indicated SL resources. It is also to be noted that since there might be multiple peer SL transmitting terminal devices, this issue to be addressed may occur for multiple peer SL transmitting terminal devices towards a single receiving terminal device.

Figure 2:
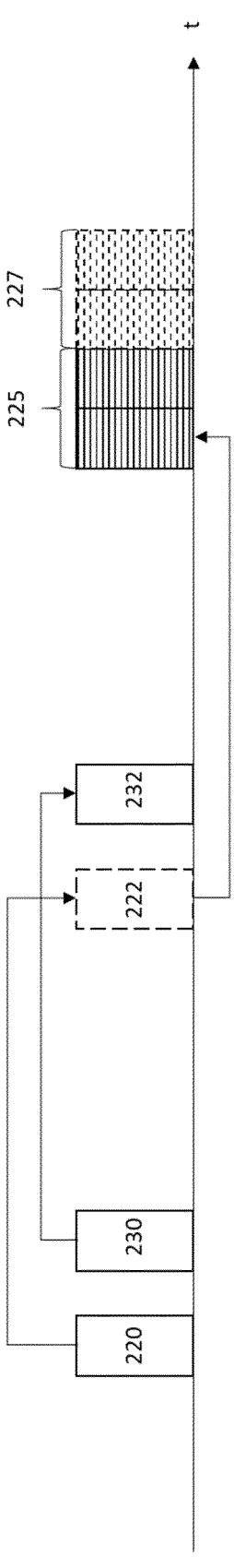
FIG. 2 illustrates an exemplary embodiment of handling a situation in which a terminal device is not able to transmit a subsequent sidelink transmission.

FIG. 2 illustrates an exemplary embodiment in which the above-mentioned issue is addressed. When a terminal device is not able to perform a SL TX in the resource indicated in an SCI associated with a previous transmission transmitted by the terminal device, a complementary resource set, CRS, for sidelink transmission, and its configured and/or associated SL CRS window, that may occur outside of the DRX On-duration of a receiving terminal device may be introduced to perform the SL TX. If a terminal device is expected to be a receiving terminal device for a sidelink transmission from a transmitting terminal device, it may provide an indication of a sidelink CRS, SL-CRS, that is associated with the receiving terminal device, to the transmitting terminal device. The terminal device that is expected to be a receiving terminal device may then monitor the SL-CRS window if it does not receive a SL TX from the transmitting terminal device over a reserved/indicated SL resource as expected. It is noted, the SL TX may contain an initial transmission or a retransmission.

In this exemplary embodiment there is a receiving terminal device that receives sidelink transmissions from two transmitting terminal devices, a first transmitting terminal device and a second transmitting terminal device. It is to be noted that in some other exemplary embodiments there may be another number of transmitting and/or receiving terminal devices. In this exemplary embodiment, the receiving terminal device has received from the first transmitting terminal device a transmission 220 and from the second transmitting terminal device a transmission 230. In the transmission 220 the first transmitting device has provided an indication regarding resources for its future transmissions such as 222. Also, the second transmitting terminal device has provided an indication regarding resources reserved for its future transmissions such as 232 in the transmission 230. Thus, the receiving terminal device has received an indication, from both transmitting devices, regarding resources for their futures sidelink transmissions and may thus expect to receive a sidelink transmission, SL TX, from each of the transmitting devices, accordingly. If the first transmitting terminal device does not transmit a SL TX 222 over the indicated resource, as expected, the first transmitting terminal device may then use the next SL-CRS window of the receiving terminal device to transmit the transmission that was supposed to be received as the SL TX 222. The next SL-CRS window in this exemplary embodiment is illustrated as 225 and it may be extended, if needed, by 227. It is to be noted, the SL-CRS window(s) 225 and/or 227 may contain continuous or discontinuous resources in time domain and/or frequency domain.

Correspondingly, if the receiving terminal device determines that it has not received the SL TX 222 during the reserved/indicated resource, then it may determine to be awake and monitor during the SL-CRS window 225, which is its next SL-CRS window. As such, monitoring a SL-CRS window by the receiving terminal device depends, in this exemplary embodiment, on if the SL data transmission from a peer transmitting terminal device took place over its pre-indicated resource. On the other hand, if the SL data transmission from the peer transmitting terminal device is detected over the pre-indicated resources, then, in this exemplary embodiment, the receiving terminal device will not spend additional power in order to monitor its next SL-CRS window.

In general, a terminal device may have one or more peer terminal devices among which it communicates using sidelink communication. The terminal device may be considered as a receiving terminal device and the one or more peer terminal device may be considered as transmitting terminal devices. The terminal devices are then configured with one or more SL-CRSs associated with the receiving terminal device. A SL-CRS associated with the receiving terminal device may comprise for example one or more of the following characteristics: a default size of the SL-CRS window; an extendable size of the SL-CRS window; time-and/or-frequency location information of the SL-CRS window, which may be either fixed and the same for the transmitting terminal devices or shifted with a configured time offset to the indicated SL resource that has been indicated by a transmitting terminal device but not used as expected for a SL TX; a criterion/requirement for using the SL-CRS, for example based on service type, transmission periodicity, priority, and/or quality of service, QoS; a method to use the SL-CRS (window), such as transmitting a SL data transmission, a SL control information, and/or a resource indicator associated to an expected SL data transmission, which is to take place in future. Based on how the SL-CRS is used and/or the SL channel condition, the size of the SL-CRS window may optionally be extended.

If the transmitting terminal device having indicated SL resources for its transmissions towards the receiving terminal device cannot transmit towards the receiving terminal device in the indicated SL resource, the transmitting terminal device determines the next SL-CRS window of the peer receiving terminal device and attempts to transmit to the receiving terminal device within the determined SL-CRS window. If there are multiple SL-CRS configurations associated with the receiving terminal device, the transmitting terminal device may determine the SL-CRS window to be used for the missed SL TX based on criterions and/or requirements associated with the different SL-CRS configurations and the missed SL TX. Transmission to the receiving terminal device within the determined SL-CRS window may be based on a method associated with the determined SL-CRS window. A method associated with a window may be understood to be a manner or a way of using the sidelink complementary resource set window.

If the receiving terminal device does not receive a transmission from its peer transmitting terminal device over an indicated SL resource, it may determine to monitor the next SL-CRS window associated with it, for example based on the SL-CRS configuration. Determining and monitoring the next SL-CRS window may further depend on the SL radio condition of the previous and/or last one or more reception from the transmitting terminal device. For example, the receiving terminal device may determine to monitor the next SL-CRS window, if the receiving terminal device does not receive a transmission from its peer transmitting terminal device over an indicated SL resource and the radio condition of the previous and/or last reception(s) is above a configured threshold.

Figure 3:
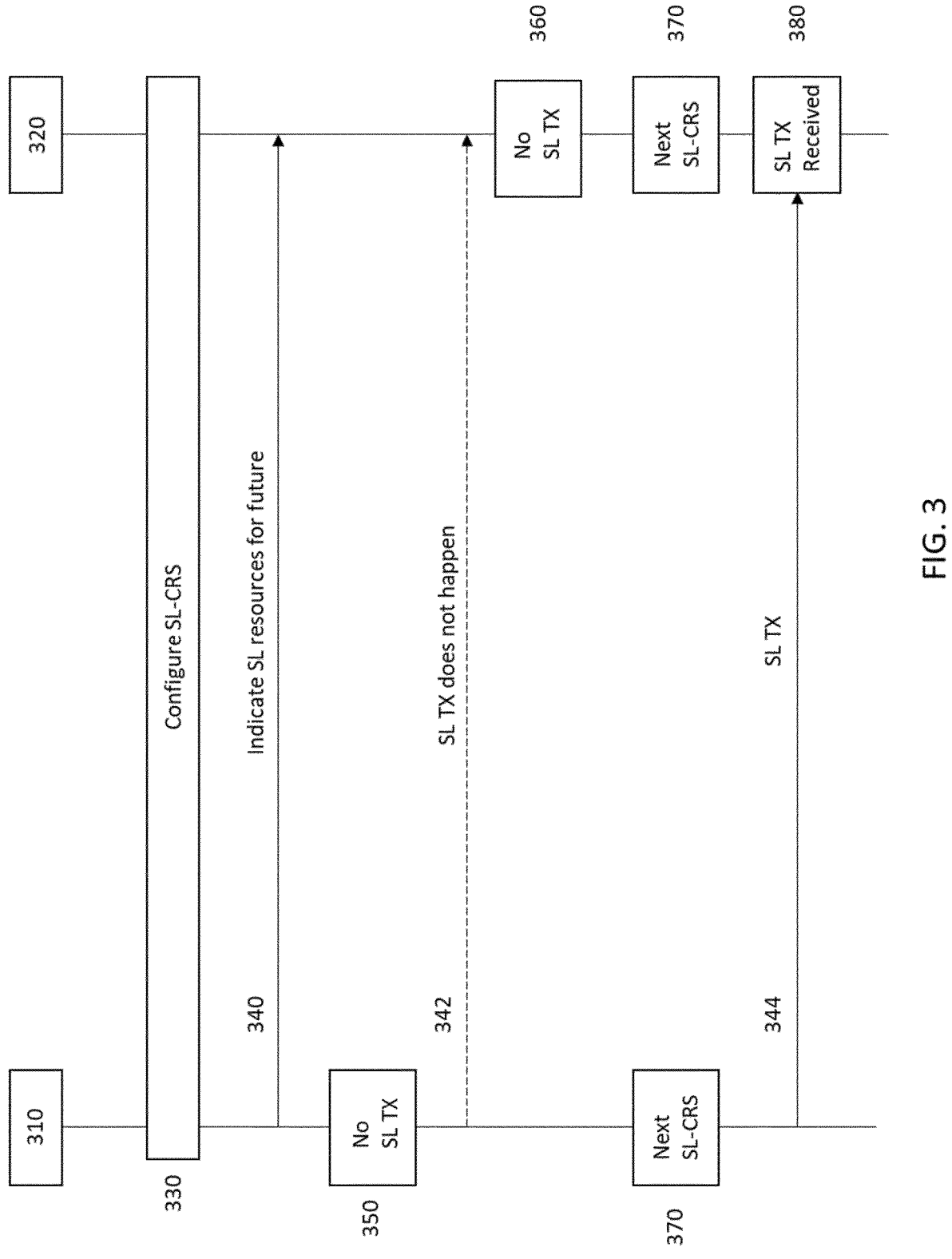
FIG. 3 illustrates a signaling chart according to an exemplary embodiment.

FIG. 3 illustrates a signaling chart of an exemplary embodiment. In this exemplary embodiment, sidelink communication occurs between a transmitting terminal device 310 and a receiving terminal device 320. In this exemplary embodiment, via the sidelink communication and/or communication with network, both the terminal device 310 and the terminal device 320 may obtain a configuration regarding a SL-CRS associated with the terminal device 320. In other words, the terminal devices are configured 330 with the SL-CRS associated with the terminal device 320. The SL-CRS may be considered as part of the SL DRX configuration of the terminal device 320 for example. The configuration may comprise one or more of the following: a size of the SL-CRS window, which may be a default size; location information regarding the SL-CRS window in time-and/or-frequency domain, such as periodically fixed for different terminal devices, or flexibly shifted with a configured time offset to an indicated SL resource that was then not used for SL TX; a criterion and/or requirement for using the SL-CRS, such as based on service type, transmission periodicity, and/or QoS; a method to use the SL-CRS window, such as transmitting a SL data, a SL control information, and/or a resource indicator associated to the to-be-transmitted SL data. It is to be noted that the size and the location information of the SL-CRS window configuration determines the SL-CRS window(s), which may not overlap with the SL DRX On-duration of the terminal device 320. It is to be noted that the SL-CRS window may occur between a sidelink resource reserved but missed and a following sidelink resource reserved by the terminal device 310 or a following DRX active period, e.g. the following SL DRX On-duration, of the terminal device 320.

The SL-CRS may be configured, in this exemplary embodiment, by using coordination between the terminal device 320 and the terminal device 310 or by using coordination from the terminal device 320 to the terminal device 310. For example, the terminal device 320 derives its SL-CRS configuration and indicates it to the terminal device 310, which optionally may be based on a request from the terminal device 310. The SL-CRS configuration may be indicated for example together with other SL DRX configurations by using for example PCS-signaling or PCS-radio resource control message, MAC control element, CE, and/or SCI. Alternatively, the configuration may be indicated separately from other SL DRX configuration. The coordination may further take into account additional information that may be provided by a base station and/or a technical specification. For example, the terminal devices 310 and 320 may be provisioned or configured by the base station with a policy and/or assistance information to derive the SL-CRS configuration. In another example, the SL-CRS configuration associated with the terminal device 320 may be obtained from a base station In some other exemplary embodiments, the SL-CRS configuration may be configured by a fixed mapping, where the mapping may consider the character(s) of the missed SL TX. For example, the terminal device 310 and 320 may each determine the SL-CRS associated with the terminal device 320 by considering the service type to be transmitted, the QoS requirement, IE(s) transmitted in the SCI, and/or identifier(s), ID(s), of the terminal device 320 and/or the terminal device 310 of the considered PCS transmission. In such a case, the terminal devices 310 and 320 do not need to use additional signaling to exchange the SL-CRS configurations, since the SL-CRS configurations may be derived by the terminal device (s) implicitly. The mapping may be configured by a specification, by implementation of the terminal device, and/or by an access node, for example via dedicated signaling or broadcasted system information block, SIB.

In yet some other exemplary embodiments, multiple peer SL transmitting terminal devices may be configured with the same SL-CRS configuration as that of a receiving terminal device, such as one or more fixed SL-CRS windows used by the receiving terminal device to receive from the multiple transmitting terminal devices. Thus, the receiving terminal device may limit its monitoring to monitor one SL-CRS window in case multiple transmitting terminal devices cannot use their indicated resources.

In some other exemplary embodiments, the SL-CRS configuration may be determined by a peer SL transmitting terminal device flexibly by using a configured time offset with regard to an SL resource indicated/reserved by a transmitting terminal device in time-and/or-frequency domain. And in yet some other exemplary embodiments, a transmitting terminal device and a receiving terminal device may use both the fixed SL-CRS window and the flexible SL-CRS window for different SL transmissions, e.g. with regard to the QoS requirements of the considered SL transmissions. For example, a flexible SL-CRS window may be applied for a SL TX requiring strict QoS requirements, such as high reliability and/or low latency, in order to ensure QoS. As another example, a fixed SL-CRS window may be applied if a SL TX has more relaxed QoS requirements, which allows the receiving terminal device to save more power.

In yet some other exemplary embodiments, the SL-CRS configuration may further take into account QoS requirements of the SL transmissions. For example, the occurring periodicity and/or location of one or more SL-CRS windows may be set such that there is a capability to meet the latency requirement of the considered SL TX. As another example, the size of the SL-CRS window may be configured large enough such that collisions are reduced, and reliability requirement is met if multiple terminal devices transmit to the receiving terminal device within the same SL-CRS window.

In some other exemplary embodiments, there may be multiple SL-CRS configurations known and may be used by a receiving terminal device and a transmitting terminal device, such that the different SL-CRS configurations may be used for different services, different data traffic profiles/patterns (e.g. transmission periodicity), different types of QoS flows (e.g. by considering latency, and/or reliability), and/or different traffic priorities. In this exemplary embodiment, a policy regarding how to use a SL-CRS configuration may be indicated by criterion or requirement associated with the SL-CRS configuration. For example, a "resource reservation period" IE and/or the "priority" IE carried in SCI may be used as the criterion to determine the proper SL-CRS configuration, which is to be used for the considered SL transmission, or re-transmission between the transmitting terminal device and the receiving terminal device.

After configuring the terminal device 310 and 320 with the SL-CRS configuration, in other words, both terminal devices have obtained or received the SL-CRS configuration based on which they may determine a SL-CRS window, the terminal device 310 transmits 340 towards the terminal device 320. This may occur for example during an SL DRX On-duration and/or wakeup time of the terminal device 320 or by using a pre-indicated SL resource. In the transmission 340, the terminal device 310 may provide an indication indicating its future SL transmission resources that may be periodic or aperiodic. It is to be noted that the transmission may also be a re-transmission. The indicating may be performed for example by using a legacy SCI according to 3GPP Rel. 16 or in any other suitable way. Based on the received indication, the terminal device 320 may monitor the indicted SL resources in future. In addition, the information indicated in 340 may be used for deriving the SL-CRS configuration by a fixed mapping, according to some exemplary embodiment(s), e.g. by the terminal devices 310 and/or 320.

The terminal device 310 may determine 350 that it will not be able to perform a SL TX during an upcoming indicated/reserved resource. In other words, a SL TX will be missed and not transmitted as expected over an indicated/reserved resource. This may be for example due to a SL logical channel prioritization, LCP, procedure executed in MAC layer, the physical-layer SL prioritization procedure, the SL resource pre-emption procedure, and/or the SL resource re-evaluation procedure. Therefore, the terminal device 310 will not transmit to the terminal device 320 a SL TX over the indicated/reserved resource. Correspondingly, as the terminal device 320 monitors the indicated/reserved resource for the expected SL TX, it detects 360 that the expected SL TX was not received over the indicated/reserved resource. In other words, the terminal device 320 detects 360 a skipped SL TX 342 from the terminal device 310. The detection 360 of the skipped SL TX 342 from the terminal device 310 by the terminal device 320 may be based on missing of sidelink control information, SCI, over physical sidelink control channel, PSCCH, from the terminal device 310 over an indicated/reserved SL resource as planned for example. Alternatively, for example, the detection of the skipped SL TX from the terminal device 310 by the terminal device 320 may be based on different source and/or destination ID, compared to the ID of the terminal device 310 or 320, carried in the second stage of SCI over PSSCH over an indicated/reserved SL resources as planned. This may be the case for example if the terminal device 310 uses the indicated/reserved SL resources to transmit to another terminal device instead of the terminal device 320 due to for example an LCP reason or if the indicated/reserved SL resources from the terminal device 310 are pre-empted by other terminal devices.

As the terminal device 310 skipped a SL TX towards the terminal device 320 over an indicated/reserved SL resource, both terminal device 310 and 320 determine 370 the next SL-CRS window for communication. For example, the terminal device 310 and the terminal device 320 may select and determine the SL-CRS configuration and the SL-CRS window based on the transmission received from the transmission 340 described above. This may be for example based on the "resource reservation period" IE and/or the "priority" IE carried in the SCI in the transmission 340. In another example, the terminal device 310 and the terminal device 320 may select and determine the SL-CRS configuration and the SL-CRS window based on the configuration obtained in 330.

After determining the SL-CRS window, the terminal device 310 transmits to the terminal device 320 via a resource within the determined SL-CRS window. It is to be noted that a SL-CRS window may comprise one or more resources, where the terminal device 310 may transmit to the terminal device 320 over one or some of them. The transmission from the terminal device 310 to the terminal device 320 may depend on a method associated with the SL-CRS configuration. The method associated with the SL-CRS configuration may comprise at least some of the followings:

Within the determined SL-CRS window, the terminal device 310 may transmit the data that was skipped in the skipped SL TX.

Alternatively, or in addition, the terminal device 310 may indicate one or more new resources the terminal device 320 should monitor and receive SL TX from the terminal device 310. For example, if terminal device 310 detects the need for skipping its transmissions over multiple indicated/reserved SL resources, the terminal device 310 may indicate/reserve a new set of SL resources. This approach may not require a large SL-CRS window size, since the resource indication/reservation message may occupy less resource than the data transmission.

Alternatively, or in addition, the transmission from the terminal device 310 may indicate an extension of the SL-CRS window associated with the terminal device 320, wherein the extension may be related with the SL radio condition. For example, a higher channel busy ratio, CBR, measured by the terminal device 310 may cause the terminal device 310 to indicate a larger extension of the SL-CRS window. This allows the terminal device 310 to transmit to the terminal device 320 over a SL resource selected from a larger resource window.

Optionally, the transmission from the terminal device 310 may be a CBR measurement, which triggers the SL- CRS window extension at the terminal device 320. In such an exemplary embodiment, the extension policy based on CBR is to be known by both terminal device 310 and 320 and it may be configured as a part of the SL-CRS configuration. Since the terminal device 320 is in a DRX mode and it may have not monitored PCS for for example 100 ms, which may be the duration required for deriving CBR, transmitting the CBR measurement from the terminal device 310 to the terminal device 320 may additionally assist the terminal device 320 in its own CBR determination, which helps the terminal device 320 to select the proper parameters for its own SL transmissions as well.

It is to be noted that in some embodiment, a SL-CRS window may comprise continuous or discontinuous SL resources. For example, the continuous or discontinuous SL resources may be aligned with a SL resource pool configuration.

In some exemplary embodiments, the determining and monitoring performed by the terminal device 320 regarding its SL-CRS may further depend on the SL radio condition detected. For example, if the terminal device 320 detects a low sidelink reference signal received power, SL-RSRP, when performing configuration 330 and/or receiving one or multiple transmissions 340 from the terminal device 310, it may not monitor its SL-CRS window if it detects a missing transmission from the terminal device 310 as the terminal device 320 may miss the transmission due to a bad radio condition instead of a skipped SL TX from the terminal device 310. In such exemplary embodiments, the terminal device 320 may only monitor the indicated/reserved SL resources either until the SL radio condition is recovered, which may be determined for example based on detecting a better SL-RSRP, or until a pre-determined time has passed, even if it detects a missing transmission from the terminal device 310.

Figures 4A, 4B:
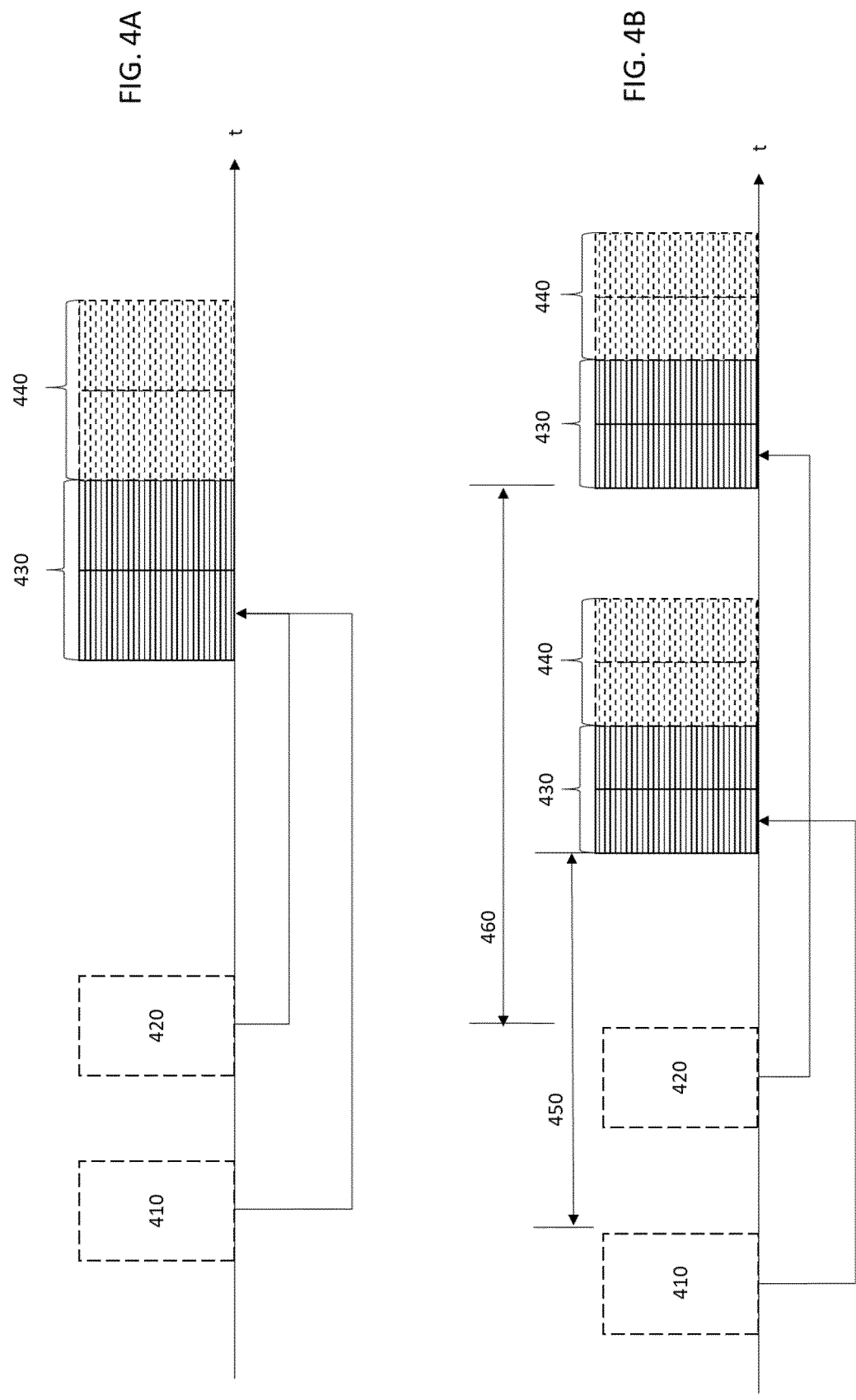
FIGS. 4A and 4B illustrate exemplary embodiments of a configuration for terminal devices to determine a sidelink complementary resource set window.

FIG. 4A illustrates an exemplary embodiment in which configuration of a transmitting terminal device, such as the terminal device 310 in the above exemplary embodiment, and a receiving terminal device, such as the terminal device 320 in the above exemplary embodiment, are configured with a SL-CRS associated with the receiving terminal device such that there are plurality of transmitting terminal devices configured with the same fixed SL-CRS window associated with the receiving terminal device. In this exemplary embodiment, the SL-CRS window 430 comprises two resources and may optionally be extended with additional resources 440. In some other exemplary embodiments, the window may comprise a different amount of resources. In this exemplary embodiment, there is a first transmitting terminal device and a second transmitting terminal device that are expected to transmit SL TX to the receiving terminal device. The first transmitting terminal device however cannot transmit SL TX 410 as expected and the second transmitting terminal device cannot transmit SL TX 420 as expected. In this exemplary embodiment, both transmit instead in the next SL-CRS window 430 and/or 440. This helps the receiving terminal device to minimize its power consumption when neither transmitting terminal device transmits during the reserved/indicated resources as it is sufficient for the receiving terminal device to monitor one SL-CRS window to receive the missed SL TXs from different transmitting terminal devices.

FIG. 4B illustrates an exemplary embodiment in which configuration of a transmitting terminal device, such as the terminal device 310 in the above exemplary embodiment, and a receiving terminal device, such as the terminal device

320 in the above exemplary embodiment, are configured with a SL-CRS associated with the receiving terminal device such that the SL-CRS window follows an indicated/reserved sidelink resource associated with the transmitting terminal device with a pre-determined time offset. In this exemplary embodiment, as in the previous exemplary embodiment, there is the first transmitting terminal device and the second transmitting terminal device performing sidelink transmissions to the receiving terminal device. The time offset 450 is for the first transmitting terminal device and the time offset 460 is for the second transmitting terminal device. Thus, if the first transmitting terminal device does not perform a SL TX towards the receiving terminal device over an indicated/reserved SL resource, it transmits within a SL-CRS window that starts the time offset 450 after the indicated/reserved SL resource. The time offset may be defined as an amount of SL slots. As different transmitting terminal devices may indicate/reserve different SL resources, the SL-CRS windows to be used by different SL Tx UEs may not overlap (partially). It is to be noted that the time offset 450 and 460 may correspond to the same amount of SL slots or they may correspond to different amounts of SL slots. In this exemplary embodiment, latency performance may be ensured as the SL-CRS window may follow an indicated/reserved SL resource with a small offset. Further, as different transmitting terminal devices may use non-overlapping SL-CRS windows, they may expect less collisions among them, which may provide good reliability.

Embodiments described herein may be compatible with a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

As used herein, the term "determining" (and grammatical variants thereof) may include: calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory), obtaining and the like. Also, "determining" can include resolving, selecting, choosing, establishing, and the like.

Figure 5:
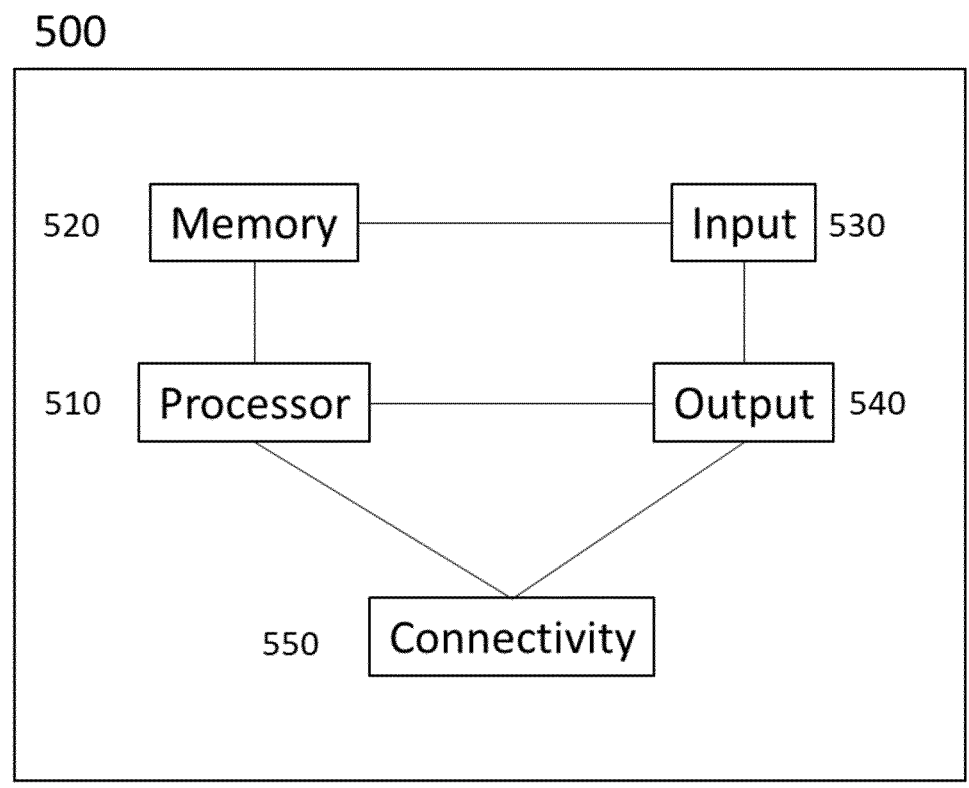
FIG. 5 illustrates an exemplary embodiment of an apparatus.

FIG. 5 illustrates an apparatus 500, which may be an apparatus such as, or comprised in, a terminal device, according to an example embodiment. The apparatus 500 comprises a processor 510. The processor 510 interprets computer program instructions and processes data. The processor 510 may comprise one or more programmable processors. The processor 510 may comprise programmable hardware with embedded firmware and may, alternatively or additionally, comprise one or more application specific integrated circuits, ASICs.

The processor 510 is coupled to a memory 520. The processor is configured to read and write data to and from the memory 520. The memory 520 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 520 stores computer readable instructions that are execute by the processor 510. For example, non-volatile memory stores the computer readable instructions and the processor 510 executes the instructions using volatile memory for temporary storage of data and/or instructions.

The computer readable instructions may have been pre-stored to the memory 520 or, alternatively or additionally, they may be received, by the apparatus, via electromagnetic carrier signal and/or may be copied from a physical entity such as computer program product. Execution of the computer readable instructions causes the apparatus 500 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 500 further comprises, or is connected to, an input unit 530. The input unit 530 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 530 may comprise an interface to which external devices may connect to.

The apparatus 500 also comprises an output unit 540. The output unit comprises or is connected to one or more displays capable of rendering visual content such as a light emitting diode, LED, display, a liquid crystal display, LCD and a liquid crystal on silicon, LCoS, display. The output unit 540 further comprises one or more audio outputs. The one or more audio outputs may be for example loudspeakers or a set of headphones.

The apparatus 500 may further comprise a connectivity unit 550. The connectivity unit 550 enables wired and/or wireless connectivity to external networks. The connectivity unit 550 may comprise one or more antennas and one or more transceivers that may be integrated to the apparatus 500 or the apparatus 500 may be connected to. The connectivity unit 550 may comprise an integrated circuit or a set of integrated circuits that provide the wireless communication capability for the apparatus 500. Alternatively, the wireless connectivity may be a hardwired application specific integrated circuit, ASIC.

It is to be noted that the apparatus 500 may further comprise various component not illustrated in the FIG. 5. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including computer program code, wherein the at least one memory and the computer program code are configured, with the at least one processor, to cause the apparatus at least to:

receive an indication from a transmitting terminal device indicative of a sidelink resource reserved for receiving a subsequent sidelink transmission from the transmitting terminal device;

detect that the subsequent sidelink transmission is not received from the transmitting terminal device over the reserved sidelink resource;

as a response to detecting that the subsequent sidelink transmission was not received over the reserved sidelink resource, monitor a sidelink complementary resource set window for receiving the subsequent sidelink transmission from the transmitting terminal device, wherein the sidelink complementary resource set window occurs between the reserved sidelink resource and a following reserved sidelink resource or a following discontinuous reception active period of the apparatus, and does not overlap with a sidelink discontinuous reception on-duration of the apparatus, wherein a size of the sidelink complementary resource set window is dynamically adjusted by signaling received during the sidelink complementary resource set window, the signaling comprising a channel busy ratio measurement reported by the transmitting terminal device, the size of the sidelink complementary resource set window being increased when the reported channel busy ratio exceeds a configured threshold;

obtain a configuration for determining the sidelink complementary resource set window, wherein the configuration comprises:

a set of sidelink complementary resources defined in a time and frequency domain, the sidelink complementary resource set window being determined as a subset of the set of sidelink complementary resources based on the detecting;

a time offset of the sidelink complementary resource set window with respect to the reserved sidelink resource, the time offset being defined as an amount of sidelink slots following the reserved sidelink resource;

a size of the sidelink complementary resource set window;

a criterion and/or requirement to use the sidelink complementary resource set window for receiving the subsequent sidelink transmission from the transmitting terminal device; and a way to use the sidelink complementary resource set window for receiving the subsequent sidelink transmission from the transmitting terminal device, wherein obtaining the configuration comprises:

obtaining the configuration from a memory of the apparatus;

obtaining the configuration from a base station; and obtaining the configuration from the transmitting terminal device; and determine the sidelink complementary resource set window based on the configuration and a sidelink radio condition of a previous sidelink transmission received from the transmitting terminal device, wherein the sidelink radio condition comprises a sidelink reference signal received power above a configured threshold and the sidelink complementary resource set window is not monitored when the sidelink reference signal received power is below the configured threshold.

\* \* \* \* \*